YOSHIICHI TAKEUCHI,
INVENTOR ical, and though a variety of methods for this purpose have been hitherto contrived, none of them can be said to be satisfactory enough.

3,520,340
METHOD OF REMOVING THE SKIN OF NUTS, BEANS AND VARIOUS OTHER SEEDS

Yoshiichi Takeuchi, 353–4 Haze-cho,
Saka-shi, Osaka-fu, Japan
Filed Apr. 30, 1968, Ser. No. 725,589
Claims priority, application Japan, May 27, 1967,
42/33,592
Int. Cl. B02b 3/00
U.S. Cl. 146—231      2 Claims

ABSTRACT OF THE DISCLOSURE

A method of removing the skin from nuts and seeds comprising the steps of immersing the nuts and seeds in hydrogen peroxide solution or metallic peroxide solution, said solution permeating the skin thereof, causing the skin to swell and at the same time causing a space between the skin and the albumen, and thereafter removing the skin from the nuts or seeds.

---

This invention relates to a method of removing the skin of nuts, beans, sesame, corn and various other seeds.

The nuts, such as peanuts, almonds, chestnuts and the like, have astringent skin tightly covering the albumen thereof and it is necessary to remove the said skin before these nuts are used for food. However, the removal of the skin is attended by extreme difficulty, and though a variety of methods for this purpose have been hitherto contrived, none of them can be said to be satisfactory enough.

In case of peanuts, for instance, there are two methods, the wet skinning method and the dry skinning method. In the known wet skinning method, the peanuts which have been swollen in hot water are taken out therefrom and cooled rapidly to make the albumen contract. Then, after breaking the skin by cutting open the slackened part thereof by means of a sharp knife, the skin being separated from the albumen by means of the skinning rollers. However, this method, involving complicated operations, is not only unsuitable for mass production but liable to leave some of the nuts with the skin as it is owing to irregularities in size and shape, and those nuts which are found still in the skin at the selecting process are scarcely utilized, which is very uneconomical.

In the known dry skinning method on the other hand, the peanuts are rapidly heated by radiant heat so that the skin thereof alone is roasted, and the skin is removed by making it brittle and ready to come off. However, very delicate control is required as it is very difficult to maintain the roasting degree in the best condition. That is to say, the so-called white roast condition must be maintained most carefully. This method, though suitable to obtain products on a mass production system, has a defect in that the quality of the products are remarkably deteriorated owing to a considerable loss of water during the roasting process.

Besides, the skin roasting method by means of high frequency current is also experimented, but it is still far from the stage of practical use and the general trend of the skinning method is toward the development of the wet skinning method.

As to chestnuts, a considerable difficulty is involved in the removal of the astringent skin, and therefore some of the manufacturers are still employing the method of removing the skin manually with the help of a knife after steaming the nuts or in the raw state.

In case of soybeans in particular, the development of the skinning method has made no advance at all, and the beans are used with the skin as it is. When red beans, broad beans, green peas and the like are processed for food by mashing them after boiling with sweetenings, the skin is not removed before boiling because of the difficulty in doing so. However, if the skin is removed prior to the processing, it goes without saying that products of higher quality can be obtained.

This invention has overcome the foregoing difficulties which have hitherto been experienced.

This invention provides a method of removing the skin of nuts and seeds, wherein such nuts and seeds are immersed in hydrogen peroxide solution or metallic peroxide solution so that the skin is permeated with either of the said solutions by agitation, if necessary, thereby making the skin swell and at the same time causing space to form between the skin and the albumen owing to generation of oxygen from the solution the nuts and seeds being skinned by passing them between the rollers immediately after washing or after drying for some time.

The details and many advantages of the invention will be made clear with reference to the undermentioned embodiments and the accompanying drawings, of which:

EMBODIMENT NO. 1

Skinning of peanuts

Figure 1:
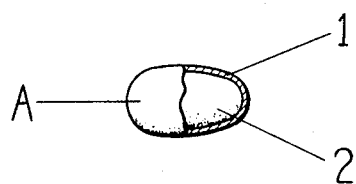
FIG. 1 is a lateral view of a peanut prior to the preliminary skinning treatment of the invention, of which a part is omitted.
Figure 2:
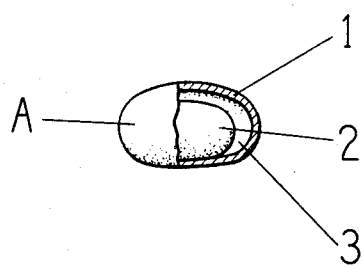
FIG. 2 is a lateral view of the foregoing nut after the preliminary skinning treatment and prior to application of the skinning apparatus of the invention, of which a part is omitted.

Peanuts 1 kg. are put into a beaker, 2.5% hydrogen peroxide solution being added until the whole of the peanuts is fully immersed, the beaker being left as it is for about a minute with the temperature maintained at a normal level (25° C.), the peanuts then being agitated with a glass rod.

Thus, hydrogen peroxide solution permeates the skin 1 of the peanuts A, thereby making the said skin 1 swell, space 3 at the same time being formed between the skin 1 and the albumen 2 owing to oxygen generated from the hydrogen peroxide solution between the said two parts 1 and 2.

After approximately three to five minutes the skin 1 is perfectly severed from the albumen 2, the peanut A floating up swollen in a globular shape. The hydrogen peroxide solution is poured out after 10 minutes, the peanuts being washed several times, skinning being executed by passing the peanuts through the known skinning rollers as soon as some wrinkles begin to appear on the skin.

EMBODIMENT NO. 2

Skinning of soybeans

Soybeans 500 g. are put into a beaker, 2.5% hydrogen peroxide solution being added thereto until the whole of the soybeans is completely immersed (about 400 ml.), the beaker being left as it is at a normal temperature. Presently the skin of the soybean starts to gather wrinkles thereon, bubbles simultaneously beginning to form between the albumen and the skin, the said two parts beginning to be separated from each other little by little. About 5 minutes later the skin is swollen into a globular shape, but the skin is not yet separated from the albumen at the part of the embryo at this stage. However, after 8 to 10 minutes the skin is completely separated from the albumen also at the said part of the embryo, the soybean becoming spheriform. Now the soybean is in a state wherein the albumen, which has absorbed no water, can move about inside the skin.

Approximately 15 minutes later the foregoing treated soybeans are taken out of the hydrogen peroxide solution, fully washed, and skinned by means of the known skinning rollers as soon as some wrinkles appear on the skin.

Hydrogen peroxide solution is used as the treating solution in both the foregoing embodiments, but the same result can be obtained by using solution of any of the metallic peroxides, such as calcium peroxide, sodium peroxide, barium peroxide and the like.

Hydrogen peroxide solution of any concentration can be used, from low concentration below 1% to high concentration of 30% which is available in the market, or even still higher concentration than that. Any metallic peroxide solution is usable so far as the concentration is within the range wherein metallic peroxides are soluble in water.

The scope of the treatable temperatures covers the whole range from the lowest level so far as the solution is not frozen up to the highest level so far as the solution is usable free from too frequent gas generation owing to degradation.

The hydrogen ion concentration of hydrogen peroxide solution or metallic peroxide solution can be even on the acid side, and the solution can be used until remarkable degradation owing to too high ion concentration renders the solution useless. The treating solution can be used continuously if supplemented with the foregoing dense solution during the repeated use.

In this invention, as per the foregoing description, the skin of nuts and seeds is made to swell simply by immersing the said nuts and seeds in hydrogen peroxide solution or metallic peroxide solution for a short space of time, the skin and the albumen being perfectly separated from each other by causing oxygen gas to generate between the skin the albumen thereby making it possible to effect skinning with ease and sureness by means of the known skinning rollers. Since the continuous treating method can be easily employed, this invention helps remarkably boost the production quantity as compared with the case of the known methods.

Hydrogen peroxide solution used as the treating solution, having sterilizing properties, can destroy the coexisting germs and other microbes. Moreover, hydrogen peroxide solution, having a bleaching effect, helps finish the product beautifully.

According to the method of this invention the skin and the albumen are separated from each other so perfectly that the subsequent skinning operation can be effected by means of the known skinning apparatus, in which rollers are used, with far greater efficiency than in the case of any of the known wet skinning methods. Therefore, skinning of the nuts and seeds which have been treated according to this invention can be easily effected taking advantage of the known skinning apparatus of any type, so far as it is of the wet skinning method.

I claim:

1. A method of skinning nuts and seeds, wherein nuts and seeds are immersed in hydrogen peroxide solution, the skin being made to swell owing to permeation of the said solution, simultaneously space being caused to form between the skin and the albumen by means of oxygen gas originated from the said solution, the nuts and seeds being skinned after washing by means of a skinning apparatus.

2. A method of skinning nuts and seeds wherein the nuts and seeds are immersed in metallic peroxide solution, the said solution being made to permeate and swell the skin, simultaneously space being caused to form between the skin and the albumen taking advantage of oxygen gas originated from the said solution, the nuts and seeds being skinned after washing making use of a skinning apparatus.

References Cited

UNITED STATES PATENTS

| | | | |
|---|---|---|---|
| 2,557,555 | 6/1951 | Miner | 146—231 X |
| 2,687,155 | 8/1954 | D'Aquin et al. | 146—231 |

W. GRAYDON ABERCROMBIE, Primary Examiner

U.S. Cl. X.R.
146—221.7, 235